United States Patent
Borovytsky

(10) Patent No.: US 8,896,683 B2
(45) Date of Patent: Nov. 25, 2014

(54) DEVICE FOR FORMING A HIGH-RESOLUTION IMAGE, IMAGING SYSTEM, AND METHOD FOR DERIVING A HIGH-SPATIAL-RESOLUTION IMAGE

(75) Inventor: Volodymyr Borovytsky, Kyiv (UA)

(73) Assignee: Freescale Semiconductor, Inc., Austin, TX (US)

( * ) Notice: Subject to any disclaimer, the term of this patent is extended or adjusted under 35 U.S.C. 154(b) by 254 days.

(21) Appl. No.: 13/376,611

(22) PCT Filed: Jul. 8, 2009

(86) PCT No.: PCT/UA2009/000031
§ 371 (c)(1),
(2), (4) Date: Dec. 7, 2011

(87) PCT Pub. No.: WO2011/005239
PCT Pub. Date: Jan. 13, 2011

(65) Prior Publication Data
US 2012/0098951 A1 Apr. 26, 2012

(51) Int. Cl.
| G06K 9/60 | (2006.01) |
| G02B 21/06 | (2006.01) |
| G02B 27/58 | (2006.01) |
| G02B 21/36 | (2006.01) |

(52) U.S. Cl.
CPC .............. *G02B 21/367* (2013.01); *G02B 21/06* (2013.01); *G02B 27/58* (2013.01)
USPC ............................................ 348/79; 382/100

(58) Field of Classification Search
None
See application file for complete search history.

(56) References Cited

U.S. PATENT DOCUMENTS

| 4,446,548 A * | 5/1984 | Bouwhuis et al. ........ 369/109.01 |
| 4,621,911 A | 11/1986 | Lanni et al. |
| 6,239,909 B1 | 5/2001 | Hayashi et al. |
| 6,248,988 B1 | 6/2001 | Krantz |
| 6,819,415 B2 | 11/2004 | Gerstner et al. |
| 7,170,696 B2 | 1/2007 | Wolleschensky |
| 7,916,304 B2 * | 3/2011 | Hess ............................... 356/496 |
| 2008/0292135 A1 * | 11/2008 | Schafer et al. ................ 382/100 |
| 2009/0125242 A1 * | 5/2009 | Choi et al. ....................... 702/19 |
| 2010/0135547 A1 * | 6/2010 | Lee et al. ....................... 382/128 |

FOREIGN PATENT DOCUMENTS

| EP | 1936422 A1 * | 6/2008 | ............. G02B 21/06 |
| WO | 97/06509 A1 | 2/1997 | |

OTHER PUBLICATIONS

Frohn Jan Tillman: "Super-Resolution Fluorescence Microscopy by Structured Light Illumination" Swiss Federal Institute of Technology Zurich, 2000, Diss. ETH No. 13916, pp. 1-143.

(Continued)

Primary Examiner — Sath V Perungavoor
Assistant Examiner — Janese Duley

(57) ABSTRACT

A device for forming a high-resolution image of an object is provided. The device comprises: an electronic camera for capturing an intermediate image of the object, an illumination system for forming a spatial modulation pattern on the object; and a spatial demodulator for performing a spatial demodulation, which is at least partially matched to the spatial modulation pattern. A method for deriving a high-spatial-resolution image from a set of images captured from a structure of an object is derived, wherein the illumination of the object is spatially-modulated, wherein the illumination of the object has a spatial modulation pattern, which is substantially periodic, wherein one of at least one prevailing orientation of the periodic illumination is arranged substantially perpendicularly to at least one prevailing orientation of the structure of the object.

20 Claims, 5 Drawing Sheets

(56) References Cited

OTHER PUBLICATIONS

Neil M. A. A. et al: "Method of Obtaining Optical Sectioning by Using Structured Light in a Conventional Microscope" Dec. 15, 1997 / vol. 22, No. 24 / Optics Letters, 1997 Optical Society of America, pp. 1905-1907.

International Search Report and Written opinion correlating to PCT/UA2009/000031 dated Mar. 25, 2010.

* cited by examiner

DEVICE FOR FORMING A HIGH-RESOLUTION IMAGE, IMAGING SYSTEM, AND METHOD FOR DERIVING A HIGH-SPATIAL-RESOLUTION IMAGE

FIELD OF THE INVENTION

This invention in general relates to a device for forming a high-resolution image. Further, this invention in general relates to an imaging system. Moreover, this invention in general relates to a method for deriving a high-spatial-resolution image.

BACKGROUND OF THE INVENTION

Dimensions of topological elements are tending to become smaller, and they have reached and under-run a limit of spatial resolution of microscope optics. Far field optical microscopes are used for observation of products of microelectronics, micro-electromechanical systems, micro-optics, and material science.

SUMMARY OF THE INVENTION

The present invention provides a device for forming a high-resolution image, an imaging system, and a method for deriving a high-spatial-resolution image as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION

Figure 1:
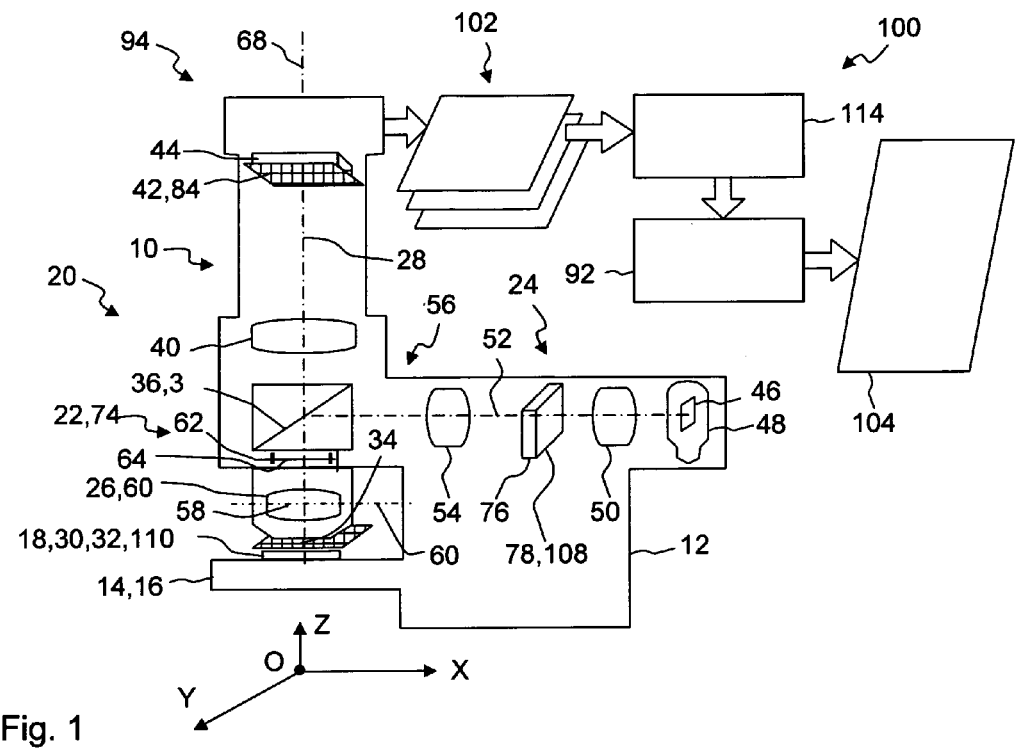
FIG. 1 shows schematically a block diagram of an example of an embodiment of an imaging system with resolution enhancement by spatial modulation of illumination (SMI), wherein the imaging system comprises an optical microscope.

Schematically shown in FIG. 1 is an example of an embodiment of a microscope 10. The microscope 10 comprises a microscope body 12, a stage 14 having a holder 16 for an object 18 (specimen) to be imaged, microscope optics 20 for an imaging channel 22, and an illumination system 24. In the configuration shown, a focus 34 of the first lens 26 is positioned in the object plane 30. In the microscope optics 20, a first lens 26 refracts light rays 28 telecentrically from an object plane 30 at the object 32 to the infinite. The refracted light rays 28 coming from the object plane 30 run through a first lens 26. The rays 28 penetrate a semi-transparent mirror 36 or a semi-transparent surface 38 of a prism 36. Then, the still parallel light rays 28 (virtually coming from an object plane in the infinite) are refracted again by a second lens 40 to an image plane 42 at a camera sensor 44. In the illumination system 24 the beam guidance may be similar. A light source 46 of a lamp 48 and a collective lens 50 produce illumination light rays 52. A large portion of the illumination light rays 52 may be collected by a lens 54 of the illumination system 24. The lens 54 of the illumination system 24 may refract the illumination light rays 52 to the infinite. The refracted illumination light rays 52 may run in parallel through a second light tube 56. There, the illumination light rays 52 may be reflected by the semi-transparent mirror 36 respectively semi-transparent surface 38 of the prism 36. Then, the still parallel illumination light rays 52 (virtually coming from the infinite) may be refracted again by the first lens 26 to illuminate the object plane 30 of the imaging channel 22.

Figure 5:
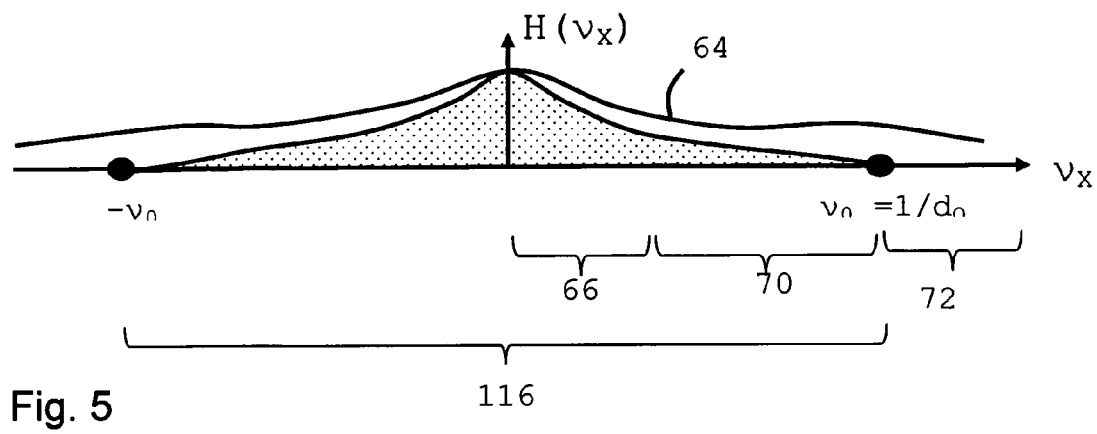
FIG. 5 shows schematically an amplitude of an example of a spatial spectrum of a surface of an object and non-modulated image to be imaged as functions of spatial frequency.
Figure 6:
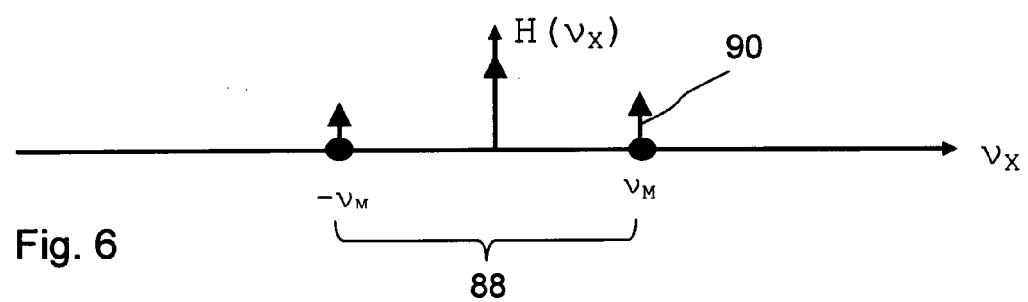
FIG. 6 shows schematically an amplitude of an example of a spatial spectrum of SMI pattern to be imaged as function of spatial frequency.

The first lens (microscope objective) 26 and the second lens (tube lens) 40 may build an image with definite linear magnification in the image plane 42 at the camera sensor 44 of the light structure 110 irradiating from the object plane 30. A light intensity per (infinite small) entrance section 58 generated by a light beam 28 may come from the object plane 30. If the aperture angle of microscope objective is σ, the light intensity per entrance section 58 may be dependent on the numerical aperture NA, which is proportional to sin(σ). Between the first lens 26 and the second lens 40, the aperture stop 62 may cut off light beam 28 and as a result it may limit the spatial bandwidth $v_0$ of optics 20 (see FIG. 5). Low spatial frequencies 66 may be transmitted by rays 28 lying near to an axis 68 of the aperture stop 62, wherein medium spatial frequencies 70 may lie close to the spatial bandwidth of optics 116. Higher spatial frequencies 72 may be cut off due to finite dimensions of the aperture stop 62, in which case they are not passed through optics 20 and not imaged at all by the imaging system 22 of the microscope 10. The resulting resolution $d_0$ of a conventional microscope can be calculated as minimal resolvable spatial period in object plane by the Abbe formula $d_0 = \lambda/(2 \cdot n \cdot \sin(\sigma))$. In this case a spatial bandwidth $v_O$ of the microscope optics 20 may be equal to $1/d_0$.

Figure 2:
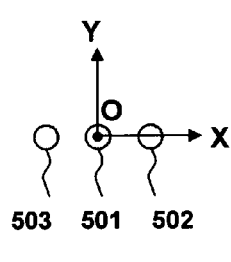
FIG. 2 schematically shows an example of an embodiment of a one-dimensional SMI pattern.
Figure 3:
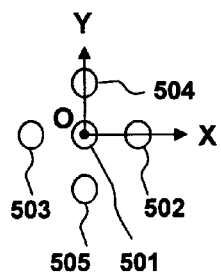
FIG. 3 to 4 schematically show, by way of example, two different two-dimensional SMI patterns.
Figure 4:
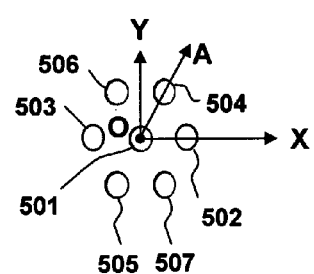
Figure 7:
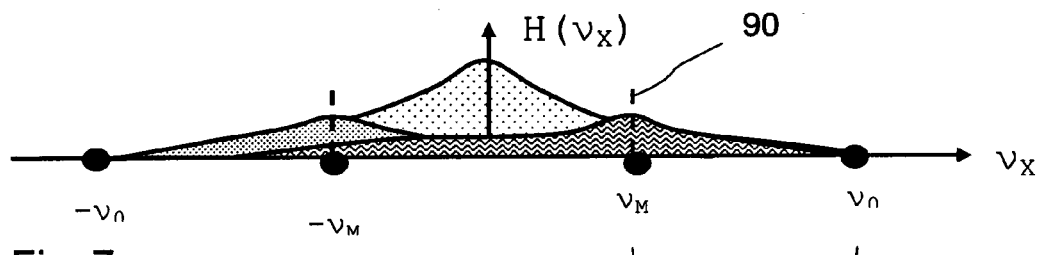
FIG. 7 shows schematically amplitudes of three spatial spectrum components of an example of a modulated image to be imaged as functions of spatial frequency.
Figure 8:
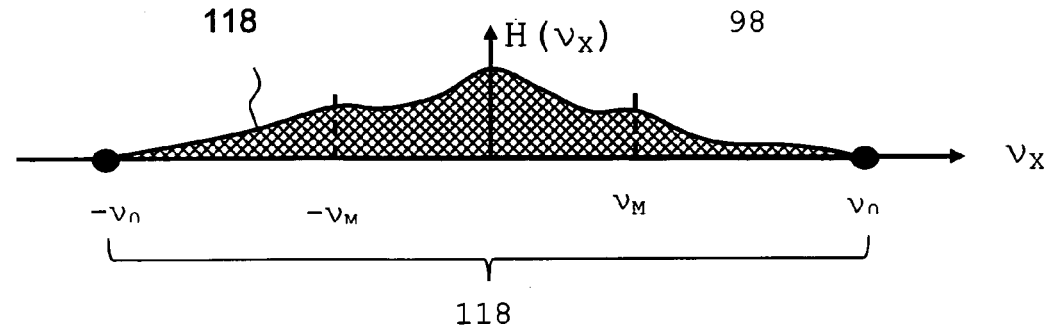
FIG. 8 shows schematically an amplitude of a spatial spectrum of an example of a spatially modulated image to be imaged as a function of spatial frequency.
Figure 11:
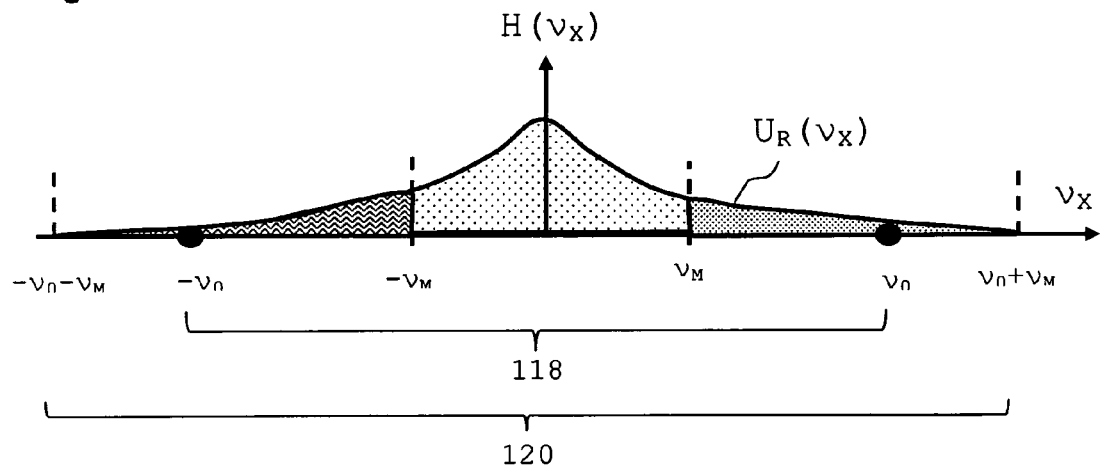
FIG. 11 shows schematically an amplitude of a spatial spectrum of an example of a high-resolution image after demodulation to be imaged as function of spatial frequency.

Therefore, SMI may provide the following solution. A unit for spatial light modulation 76 may be inserted in the illumination system 24 providing a spatial modulation pattern 80 (illumination pattern 80). FIG. 2 schematically shows, by way of example, a one-dimensional spatial modulation pattern, and each of FIG. 3 to 4 schematically shows, by way of example, a different two-dimensional modulation pattern 80. In the example shown, the light source 46 comprising the lamp 48 and the condenser lens 50 thus produces illumination light rays 52 penetrating the spatial modulation object 76, for example an SMI film. A large portion of illumination light rays 52 passing through the spatial modulation object 76 may be collected by the lens 54 of the illumination system 24. The lens 54 of the illumination system 24 may telecentrically refract the illumination light rays 52 from a spatial modulation plane 78 of the unit for spatial light modulation 76 to the infinite. The refracted illumination light rays 52 coming from the spatial modulation plane 78 may run through the second light tube 56 in parallel. They may then be reflected by the semi-transparent mirror 36 respectively semi-transparent surface 38 of the prism 36. Then, the parallel illumination light rays 52 (virtually coming from the infinite) may be refracted again by the first lens 26 to illuminate the object plane 30 of the imaging channel 22 by the spatial modulation pattern 80. In principle, the invention may also be applicable to microscopes 10 which employ microscope optics 20 suitable for other types of rays 28, 52 than photon rays. To this end, at least one of the microscope optics 20 and the illumination system 24 may comprise an electron lens, a positron lens, a proton lens, an ion lens, a neutron lens, or a lens for acoustical waves. Moreover, the microscope 10 may be a fluorescence microscope 10. By illuminating the object 18 with the spatial modulation pattern 80, the light irradiating from the object plane 30 and imaged on the camera sensor 44 may be spatially-modulated by the spatial modulation pattern 80. By the spatial modulation in the object plane 30, high spatial harmonics that are outside a bandwidth $v_0$ of the microscope optics 20 may be shifted down as shown, by way of example, in FIG. 7. After passing the microscope optics 20 the shifted-down high spatial harmonics 72 may be restored by shifting them back. This is illustrated, by way of example, in FIG. 11.

Basically, SMI may employ lower-sideband single-sideband modulation (LSB-SSB) known from communications theory (see FIG. 5 to 8). The object surface with spatially modulated illumination 32 may be imaged to the camera sensor 44. The shifted-down high spatial harmonics 72 may then be recovered at a demodulator 92 from the spatially-modulated images 84, 102 at the camera sensor 44 and used for demodulation, for example by using the proposed demodulation 92. In the example shown, the demodulation 92 has the effect of shifting the lower side band 98 back to the original place 72 of the spatial spectrum of the pertaining information (see FIG. 9 to 11). Thus, SMI may be employed to enhance the spatial resolution of the microscope 10. A restoration of high spatial harmonics 72 may be even possible for non-transparent objects 32 when SMI has low contrast and when standing wave illumination is not applicable. This restoration may be also possible for transparent objects 32 with low contrast SMI. In other words, using SMI, high spatial harmonics 72 outside a bandwidth $v_0$ of the microscope optics 20 can be shifted to lower frequencies 98 and then be passed through the microscope optics 20 (see FIG. 5 to 8). Afterwards, the shifted harmonics 72 can be restored. In general, this can be done using, for example, an analogue or a digital image processing 92. The proposed SMI may enable a microscope 10 to resolve objects 18 with dimensions 10% to 49% smaller than without SMI. Using several digital images 102 captured with SMI, the limited modulated spatial spectrum 88 can be "disassembled", and a high resolution image 104 can be restored (see FIG. 9 to 11). Here, spatial demodulation means expanding the bandwidth $v_0$ of the microscope optics 10. Thereby, the "synthetic aperture" microscope optics 20 may provide an enhanced resolution $d_M = 1/(v_0 + v_M)$ (see FIG. 9 to 11). In the following, an algorithm for restoration of a high-resolution image 104 based on images 102 captured with SMI is described. The algorithm may be applicable in particular if the contrast of SMI is in range 1% to 100%. The algorithm may be applicable in particular to any SMI phases that differ from each other. For increasing contrast in the area of spatial modulation frequencies 98 optimal linear digital filtering 114 may be applied.

Figure 12:
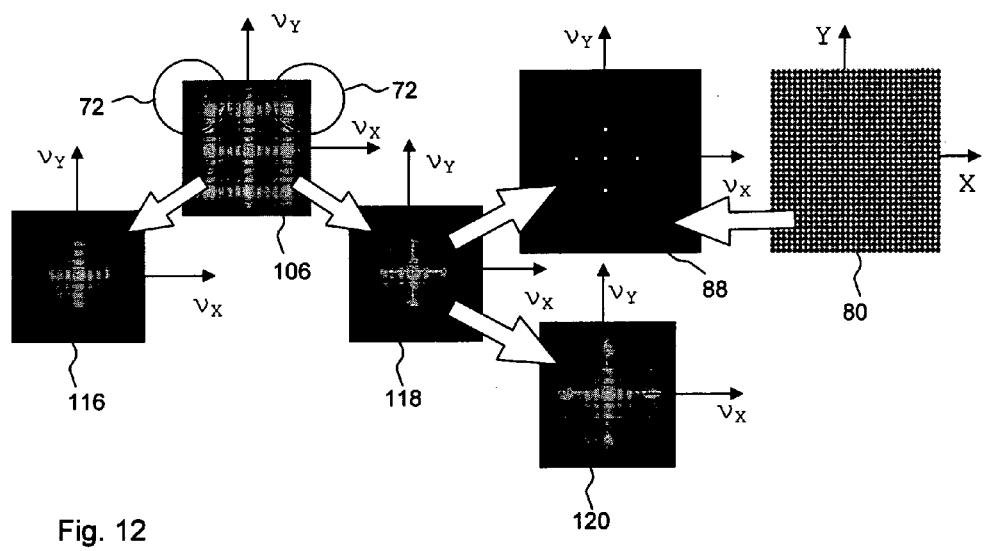
FIG. 12 shows, by way of example, a distribution of amplitudes of spatial spectrums of non-modulated image, modulated image, spatial modulation pattern and high-resolution image after demodulation.

FIG. 12 provides a schematic overview about results of a mathematical proof of the concept according to an embodiment. According to this embodiment, a regular two-dimensional spatial modulation pattern 80 provides a spatial amplitude modulation of illumination corresponding to a spatial spectrum 88 of the spatial modulation pattern 80. The spatial spectrum 106 of the "image" at the object plane 30 has spectral portions 72 with high frequencies. However, a spatial spectrum 116 of the "same" image 84 captured from the camera sensor 44 can be limited by a bandwidth $v_0$ of the microscope optics 20. A spatial spectrum 118 of an image 84 of the same, but spatially-modulated object 32 may be still limited by the bandwidth $v_0$ of the microscope optics 20, but contains shifted high spatial harmonics 98, due to SMI. Therefore, the spatial spectrum 120 of the image 84 spatially demodulated by the proposed spatial demodulation 92 can be wider. Therefore, it can be possible to see smaller features 402 (see FIG. 14).

Figure 13:
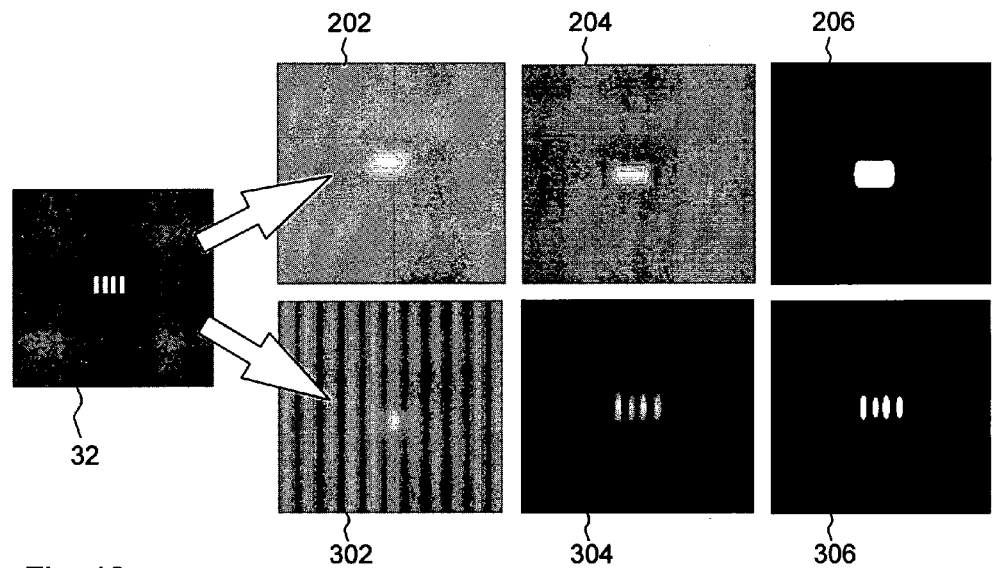
FIGS. 13 and 14 show simulation results of an example of SMI-enhanced imaging.

FIG. 13 provides a schematic overview about a mathematical confirmation of the resolution enhancement provided by SMI according to the embodiment referred to above with reference to FIG. 12. The test bar period of object 32 may be 30% smaller than the Abbe limit of resolution $d_0$. The images 202, 204, 206 show the optical image before, respectively after digital filter 114, respectively after image binarization (threshold processing) in a conventional microscope. The images 302, 304, 306 show the optical image before, respectively after digital processing 100, respectively after image binarization (threshold processing) in a microscope 10 employing SMI.

Figure 14:
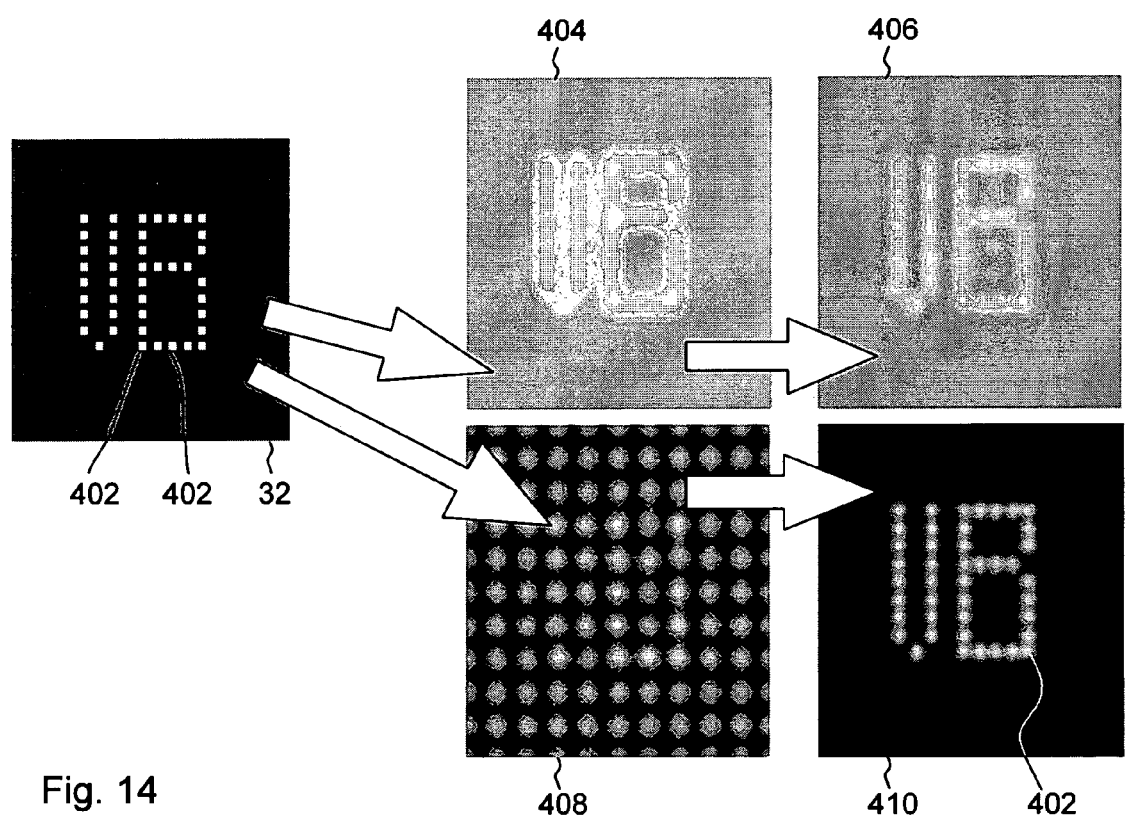

FIG. 14 provides a schematic overview about simulation results of the imaging using SMI according to the embodiment referred to above with reference to FIGS. 12 and 13. The test bars 402 of the object 32 have the dimensions of 100×100 nm with period 200 nm. Images 404 and 406 show the output images before, respectively after digital filter 114 of a microscope 10 not employing SMI (wavelength 550 nm; microscope optics 100/0.95, resolution $d_O$=290 nm). Images 408 and 410 show the output image before respectively after digital spatial demodulation 92 by a microscope 10 employing SMI. With SMI the sub-structure having square elements 402 can be still visible. The simulation results shown in table 1 indicate that the proposed techniques allow to see features 402 having a size which can be 10% to 49% smaller than a half of minimal resolvable spatial period $d_0$ called Abbe limit of microscope resolution.

TABLE 1

| Microscope optics (wavelength) | Resolution without SMI, $d_O$ | Resolution with SMI, $d_M$ |
|---|---|---|
| 100x/1.45 (550 nm—visual) | 190 nm | 120 nm |
| 100x/1.30 (365 nm—ultraviolet) | 140 nm | 90 nm |
| 200x/1.25 (248 nm—deep ultraviolet) | 100 nm | 60 nm |

For the selection of the microscope optics 20, the digital camera 44, the digital filter 114, the spatial modulation frequency $v_M$ and of other SMI parameters that minimize distortions in the output high-resolution image 104, the following guidelines may be followed:

The microscope 10 may have or use an illumination system 24 that forms a projection of a periodic spatial modulation pattern 80 in an object plane 30 of the imaging channel 22. The object plane 30 may be arranged where a surface of the object to be observed is located.

The periodic spatial modulation pattern 80 may be a one- or two-dimensional periodic structure 80 having a sinusoidal, quasi-sinusoidal or binary (multi bar) distribution of amplitude. The spatial modulation pattern 80 may have maximal possible contrast.

The periodic spatial modulation pattern 80 may be realized using a film 76 having a two-dimensional periodic distribution 80 of transmittance or reflectance. The film 76 may be located in an illumination channel of the illumination system 24 in a plane 78 which is a projection of the object plane 30 of the imaging channel 22. The film 76 may be installed onto a driver 108 that provides precise movement 112 of the spatial modulation pattern 80 in the object plane 30. The spatial modulation pattern 80 may be created by one of the following devices: a spatial light modulator 76 based on liquid crystals, and a micro-mirror array. Other optics 54 of the illumination channel may form the image 110 of the spatial modulation pattern 80 in the object plane 30.

The spatial light modulator 76 may introduce a precise movement 112 of the image 110 of the spatial modulation pattern 80 in the object plane 30. The illumination unit 24 that may apply a standing-wave structure or may form the image 110 of the spatial modulation pattern 80 to be formed in the object plane 30 may have a possibility of precisely moving the image 110 of the spatial modulation pattern 80 in the object plane 30. The image 110 of the spatial modulation pattern 80 may be moved in relation to the object 32 by moving the object 32 in the object plane 30. A laser scanning unit, an array of light emitted diodes, and an array of lasers may be used to form the image 110 of the spatial modulation pattern 80 to be formed in the object plane 30, including the possibility of precise movement 112 of the spatial modulation pattern 80 imaged in the object plane 30.

The spatial frequency $v_M$ of the image 110 of spatial modulation pattern 80 in the object plane 30 may be in the range of 10% to 99% of a spatial bandwidth $v_O$ of the microscope optics 20:

$$v_M = \varepsilon_M \cdot v_O = \frac{\varepsilon_M}{d_O} = \varepsilon_M \cdot \frac{1}{\left(\frac{\lambda}{2 \cdot NA}\right)}$$

where $v_M$ is the spatial frequency of SMI in the object plane 30 of the imaging channel 22; $\varepsilon_M$ is a normalized spatial frequency of SMI that defines $v_M$ as the part of $v_O$, which may be in the range of 0.10 to 0.99; $v_O$ is a maximal spatial frequency passed through the microscope optics 20 called spatial bandwidth equal to $1/d_O$; $d_O$ is the minimal resolvable spatial period called Abbe limit of spatial resolution; $\lambda$ is a wavelength; and NA is a numerical aperture of the microscope optics 20; $NA = n \cdot \sin(\sigma)$; n is refractive index in object space.

The spatial frequency of SMI $v_M$ may be bigger than a half of bandwidth $v_O$ to obtain SMI close to harmonic modulation (see FIG. 2, 7).

To obtain a high-resolution output image 104, several input images 102 may be captured with SMI using one of the following techniques:

In case of a one-dimensional periodic spatial modulation pattern 80, three input images 102 may be captured: the first 501 without shift of the spatial modulation pattern image 110, the second 502 and the third 503 with shift of the spatial modulation pattern image 110 to approximately ⅓ respectively −⅓ of a spatial period $1/v_M$ of SMI along a direction of SMI. These shifts introduce relative phase shifts of SMI. The proposed demodulation 92 may be possible for any SMI phases that are different from each other. Thus the shifts of spatial modulation pattern 80 may be various and may differ from each other. FIG. 2 to 4 show positions of reference points of the patterns 80 with reference to a focus point of lens 26 in the object plane 30.

In case of a two-dimensional periodic spatial modulation pattern 80 five input images 102 may be captured: the first 501 without shift of the pattern image 80, the second 502 and the third 503 with shift of the pattern image 80 to approximately ⅓ respectively −⅓ of the spatial period $1/v_M$ of SMI along an axis OX respectively to the first 501, the second 502 and the third 503 with shift of the pattern image 80 to approximately ⅓ respectively −⅓ of the spatial period $1/v_M$ of SMI along an axis OY (see FIG. 3). The proposed demodulation 92 may be possible for any SMI phases that are different from each other. Thus the shifts of spatial modulation pattern 80 may be various and may differ from each other.

In an alternative, in case of a two-dimensional periodic spatial modulation pattern 80, seven input images 102 may be captured: the first three images 501, 502, 503 may be captured as described before, the next four images 504, 505, 506, 507 may be captured with shift of pattern image 80 to approximately ⅓ respectively −⅓ of the spatial period $1/v_M$ of SMI along an axis rotated approximately +60 and −60 degrees in relation to axis OX (see FIG. 4). The proposed demodulation 92 may be possible for any SMI phases that are different from each other. Thus the shifts of spatial modulation pattern 80 may be various and may differ from each other.

To each input image 102 a linear digital filter 114 for contrast enhancement may be applied. The transfer function of this filter 114 may compensate distortions introduced by the microscope optics 20 and by the digital camera 44 in an range from 0 to a zone of spatial frequency 98 of SMI (see FIG. 5):

$$H_O(v_X, v_Y) \cdot H_D(v_X, v_Y) \cdot H_F(v_X, v_Y) \approx 1, |v_X| \leq v_M, |v_Y| \leq v_M$$

where $H_O(v_X, v_Y)$, $H_D(v_X, v_Y)$, $H_F(v_X, v_Y)$ are spatial transfer functions of the microscope optics 20, the digital camera 44 and the digital filter calculated for the object plane 30 of imaging channel 22, respectively; $v_X$, $v_Y$ are spatial frequencies corresponding to coordinate axes OX, OY, respectively;

$$H_F(v_X, v_Y) = \begin{cases} \left(\frac{1}{H_O(v_X, v_Y) \cdot H_D(v_X, v_Y)}\right), & |v_X| \leq v_M, |v_Y| \leq v_M \\ H(v_X, v_Y), & 0 \leq |H(v_X, v_Y)| \leq \left|\frac{1}{H_O(v_X, v_Y) \cdot H_D(v_X, v_Y)}\right|, \end{cases}$$

otherwise
where $H(v_X, v_Y)$ is the high spatial frequency part of $H_F(v_X, v_Y)$.

After digital filtering, the phases $\phi_0, \phi_1, \phi_2$ of SMI and a precise value of the spatial period $1/v_M$ of SMI may be calculated for all input images 102. For example, the phases $\phi_0,\phi_1,\phi_2$ of SMI may be calculated as a phase that corresponds to the maximal amplitude of the spatial spectrum 98 in a zone $\nu_M \pm (0.01 \ldots 0.25) \cdot \nu_M$ near the known value of $\nu_M$. The precise value of the spatial period $1/\nu_M$ of SMI may be calculated as a period in pixels corresponding to the spatial frequency $\nu_M$ of the maximal amplitude of the spatial spectrum 98 in the zone near the known value of $\nu_M$.

The image size $M_X$, $M_Y$ may be selected equal to an integer number of spatial periods of SMI in modulated images. To obtain a pure harmonic (sinusoidal) SMI in modulated images 102 (see FIG. 6), the image size $M_X$, $M_Y$ is corrected as follows:

$$M_X = \text{int}\left(p_X \cdot \text{int}\left(\frac{N_X}{p_X}\right)\right)$$

$$M_Y = \text{int}\left(p_Y \cdot \text{int}\left(\frac{N_Y}{p_Y}\right)\right)$$

where $M_X$, $M_Y$ is the corrected two-dimensional image size equal to an integer number of spatial periods of SMI along axes OX, OY, respectively; $N_X$, $N_Y$ is the initial image size; $p_X$, $p_Y$ is the measured two-dimensional spatial period of SMI along axes OX, OY in pixels, respectively; int( ) is a function that returns the integer part of a real argument, in other words it cuts off a fractional part of an argument.

To obtain the output image, the Fourier transform F can be applied to each processed input image 102 with corrected image size $M_X$, $M_Y$. If the one-dimensional periodic spatial modulation pattern 80 is used, a one-dimensional Fourier transform F can be calculated in direction of SMI. If the two-dimensional periodic spatial modulation pattern 80 is used, a two-dimensional Fourier transform F can be calculated for the images 102. To restore high spatial frequencies 72 located outside the spatial bandwidth $\nu_0$ of the microscope optics 20, the following calculations may be performed on the spatial spectrums 116 of the processed input images 102:

In case of a one-dimensional pattern 80 and three input images 102, each image row $u_R(x)$ can be restored using the following formulas:

$$u_R(x) = F^{-1}(U_R(\nu_X))$$

where $u_R(x)$ is the restored image row having an higher spatial resolution; $F^{-1}$ is the symbol of the inverse discrete Fourier transform; and $U_R(\nu_X)$ is the spatial spectrum of the restored image row (see FIG. 11):

$$U_R(\nu_X, \nu_Y) = \begin{cases} U_1(\nu_X - \nu_R, \nu_Y), & \nu_X \in ]\nu_R, \nu_R + \nu_0] \\ U_0(\nu_X, \nu_Y), & \nu_X \in [-\nu_R, \nu_R] \\ U_2(\nu_X + \nu_R, \nu_Y), & \nu_X \in [-\nu_0 - \nu_R, -\nu_R[ \end{cases}$$

$\nu_R$ is the spatial frequency used for image restoration 92, wherein the spatial frequency $\nu_R$ may be selected in the range of $\nu_M \pm ((0.01 \ldots 0.50) \cdot \nu_M)$. $U_0(\nu_X)$, $U_1(\nu_X)$, and $U_2(\nu_X)$ are the spatial spectrums of the image row $u_R(x)$ passed through the microscope optics 20 and shifted to $\pm \nu_M$, due to SMI (see FIG. 10). They can be calculated as follows:

$$R_1 \cdot \begin{vmatrix} U_0(\nu_X) \\ U_1(\nu_X) \\ U_2(\nu_X) \end{vmatrix} = \begin{vmatrix} U_{\varphi 0}(\nu_X) \\ U_{\varphi 1}(\nu_X) \\ U_{\varphi 2}(\nu_X) \end{vmatrix}$$

$$R_1^{-1} \cdot \begin{vmatrix} U_{\varphi 0}(\nu_X) \\ U_{\varphi 1}(\nu_X) \\ U_{\varphi 2}(\nu_X) \end{vmatrix} = \begin{vmatrix} U_0(\nu_X) \\ U_1(\nu_X) \\ U_2(\nu_X) \end{vmatrix}$$

Figure 9:
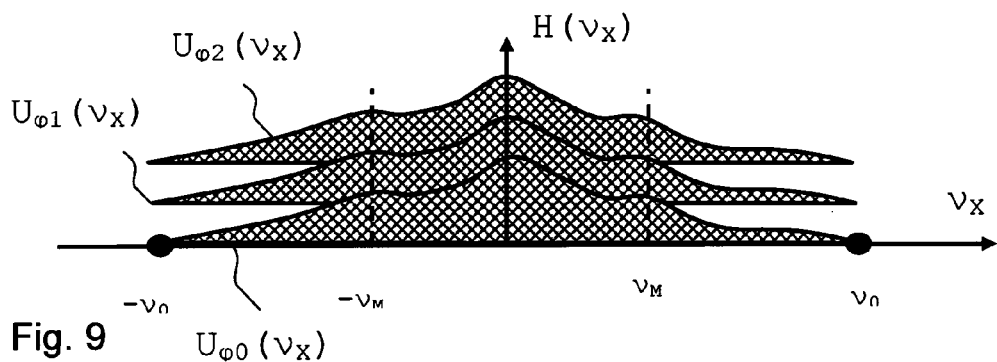
FIG. 9 shows schematically amplitudes of three spatial spectrums of an example of a modulated image with different SMI phases to be imaged as functions of spatial frequency.
Figure 10:
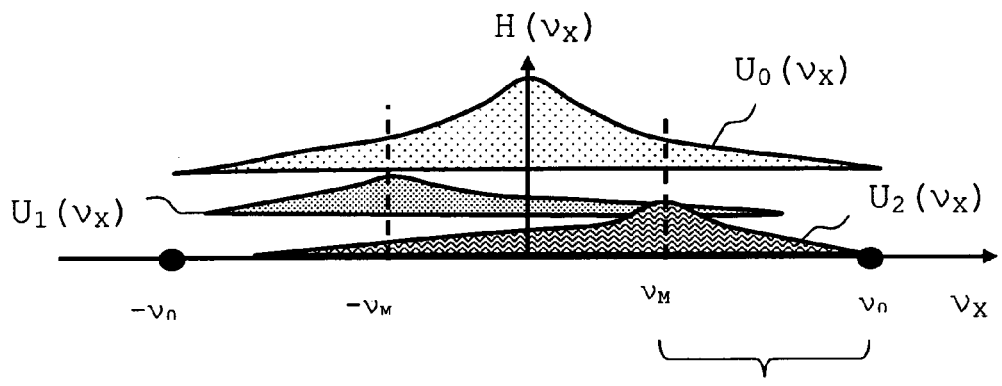
FIG. 10 shows schematically amplitudes of three spatial spectrum components of an example of a modulated image after demodulation to be imaged as functions of spatial frequency.

$U_{\varphi 0}(\nu_X)$, $U_{\varphi 1}(\nu_X)$, and $U_{\varphi 2}(\nu_X)$ are the spatial spectrums of rows of intermediate images 102 with SMI passed through the microscope optics 20 having phase $\phi_0,\phi_1,\phi_2$ of SMI, respectively (see FIG. 9). $R_1^{-1}$ is the inverse matrix of $R_1$; $R_1$ is the matrix used for image restoration 92:

$$R_1 = 0.25 \cdot k_M \cdot \begin{vmatrix} \frac{(1 - 0.5 \cdot k_M)}{0.25 \cdot k_M} & 1 & 1 \\ \frac{(1 - 0.5 \cdot k_M)}{0.25 \cdot k_M} & \exp(-j \cdot (\varphi_1 - \varphi_0)) & \exp(j \cdot (\varphi_1 - \varphi_0)) \\ \frac{(1 - 0.5 \cdot k_M)}{0.25 \cdot k_M} & \exp(-j \cdot (\varphi_2 - \varphi_0)) & \exp(j \cdot (\varphi_2 - \varphi_0)) \end{vmatrix} =$$

$$= 0.25 \cdot k_M \cdot \begin{vmatrix} K_1 & 1 & 1 \\ K_1 & \exp(-j \cdot (\varphi_1 - \varphi_0)) & \exp(j \cdot (\varphi_1 - \varphi_0)) \\ K_1 & \exp(-j \cdot (\varphi_2 - \varphi_0)) & \exp(j \cdot (\varphi_2 - \varphi_0)) \end{vmatrix}$$

$k_M$ is the spatial modulation contrast or spatial modulation depth measured or calculated in an image 102; $k_M$ is in the range from 0 to 1; $K_1$ is the coefficient: $K_1 = 4 \cdot (1 - 0.5 \cdot k_M)/k_M$; j is the coefficient: $j^2 = -1$.

For the two-dimensional pattern 80 and five input images 102, the equations may be expanded to two-dimensional space, as follows:

$$u_R(x,y) = F^{-1}(U_R(\nu_X, \nu_Y))$$

where $u_R(x,y)$ is the restored image 104 having a higher spatial resolution. $U_R(\nu_X, \nu_Y)$ is the spatial spectrum of restored image 104 (see FIG. 12):

$$U_R(\nu_X, \nu_Y) = \begin{cases} U_{10}(\nu_X - \nu_M, \nu_Y), & \left(\sqrt{\nu_X^2 + \nu_Y^2}\right) \ge \nu_R, \nu_X > 0, |\nu_X| \le |\nu_Y| \\ U_{20}(\nu_X + \nu_M, \nu_Y), & \left(\sqrt{\nu_X^2 + \nu_Y^2}\right) \ge \nu_R, \nu_X < 0, |\nu_X| \le |\nu_Y| \\ U_0(\nu_X, \nu_Y), & \left(\sqrt{\nu_X^2 + \nu_Y^2}\right) \le \nu_R \\ U_{01}(\nu_X - \nu_M, \nu_Y), & \left(\sqrt{\nu_X^2 + \nu_Y^2}\right) \ge \nu_R, \nu_Y > 0, |\nu_X| > |\nu_Y| \\ U_{02}(\nu_X + \nu_M, \nu_Y), & \left(\sqrt{\nu_X^2 + \nu_Y^2}\right) \ge \nu_R, \nu_Y < 0, |\nu_X| > |\nu_Y| \end{cases}$$

$U_{00}(\nu_X, \nu_Y)$, $U_{10}(\nu_X, \nu_Y)$, $U_{20}(\nu_X, \nu_Y)$, $U_{01}(\nu_X, \nu_Y)$, $U_{02}(\nu_X, \nu_Y)$ are the spatial spectrum components of the input images passed through the microscope optics 20 and shifted to $\pm \nu_M$, due to the two-dimensional SMI pattern 80 (see FIG. 12):

$$R_X \cdot \begin{vmatrix} U_X(\nu_X, \nu_Y) \\ U_{10}(\nu_X, \nu_Y) \\ U_{20}(\nu_X, \nu_Y) \end{vmatrix} = \begin{vmatrix} U_{\varphi 00}(\nu_X, \nu_Y) \\ U_{\varphi 10}(\nu_X, \nu_Y) \\ U_{\varphi 20}(\nu_X, \nu_Y) \end{vmatrix}$$

$$\begin{vmatrix} U_X(\nu_X, \nu_Y) \\ U_{10}(\nu_X, \nu_Y) \\ U_{20}(\nu_X, \nu_Y) \end{vmatrix} = R_X^{-1} \cdot \begin{vmatrix} U_{\varphi 00}(\nu_X, \nu_Y) \\ U_{\varphi 10}(\nu_X, \nu_Y) \\ U_{\varphi 20}(\nu_X, \nu_Y) \end{vmatrix}$$

$$R_Y \cdot \begin{vmatrix} U_{\varphi 00}(\nu_X, \nu_Y) \\ U_{\varphi 01}(\nu_X, \nu_Y) \\ U_{\varphi 02}(\nu_X, \nu_Y) \end{vmatrix} = \begin{vmatrix} U_Y(\nu_X, \nu_Y) \\ U_{01}(\nu_X, \nu_Y) \\ U_{02}(\nu_X, \nu_Y) \end{vmatrix}$$

-continued $$\begin{vmatrix} U_Y(v_X, v_Y) \\ U_{01}(v_X, v_Y) \\ U_{02}(v_X, v_Y) \end{vmatrix} = R_Y^{-1} \cdot \begin{vmatrix} U_{\varphi 00}(v_X, v_Y) \\ U_{\varphi 01}(v_X, v_Y) \\ U_{\varphi 02}(v_X, v_Y) \end{vmatrix}$$

$U_{\phi 00}(v_X, v_Y)$, $U_{\phi 01}(v_X, v_Y)$, $U_{\phi 10}(v_X, v_Y)$, $U_{\phi 02}(v_X, v_Y)$, $U_{\phi 20}(v_X, v_Y)$ are the spatial spectrums of intermediate images 102 with SMI passed through the microscope optics 20 having two-dimensional phases of SMI $\phi_{00}, \phi_{10}, \phi_{20}$ when spatial modulated pattern is shifted on object 32 along axis OX and $\phi_{00}, \phi_{01}, \phi_{02}$ along axis OY, respectively. $U_X(v_X, v_Y)$, $U_Y(v_X, v_Y)$, can be calculated:

$$U_Y(v_X, v_Y) = K_2 \cdot U_{00}(v_X, v_Y) + U_{01}(v_X, v_Y) + U_{02}(v_X, v_Y)$$

$$U_X(v_X, v_Y) = K_2 \cdot U_{00}(v_X, v_Y) + U_{10}(v_X, v_Y) + U_{20}(v_X, v_Y)$$

$U_{00}(v_X, v_Y)$ can be calculated using $U_X(v_X, v_Y)$, $U_Y(v_X, v_Y)$:

$$U_{00}(v_X, v_Y) = \frac{1}{K_2} \cdot (U_X(v_X, v_Y) - U_{10}(v_X, v_Y) - U_{20}(v_X, v_Y)) ==$$

$$\frac{1}{K_2} \cdot (U_Y(v_X, v_Y) - U_{01}(u_X, v_Y) - U_{02}(v_X, v_Y))$$

$R_X^{-1}$ and $R_Y^{-1}$ are the inverse matrixes of $R_X$ and $R_Y$, respectively;

$R_X$ and $R_Y$ are the matrix used for image restoration 92:

$$R_X = 0.125 \cdot k_M \cdot \cdot \begin{vmatrix} K_2 & 1 & 1 \\ K_2 & \exp(j \cdot (\varphi_{10} - \varphi_{00})) & \exp(-j \cdot (\varphi_{10} - \varphi_{00})) \\ K_2 & \exp(j \cdot (\varphi_{20} - \varphi_{00})) & \exp(-j \cdot (\varphi_{20} - \varphi_{00})) \end{vmatrix}$$

$$R_Y = 0.125 \cdot k_M \cdot \cdot \begin{vmatrix} K_2 & 1 & 1 \\ K_2 & \exp(j \cdot (\varphi_{01} - \varphi_{00})) & \exp(-j \cdot (\varphi_{01} - \varphi_{00})) \\ K_2 & \exp(j \cdot (\varphi_{02} - \varphi_{00})) & \exp(-j \cdot (\varphi_{02} - \varphi_{00})) \end{vmatrix}$$

$$K_2 = \frac{[1 - 0.5 \cdot k_M]}{0.125 \cdot k_M} = 8 \cdot \frac{[1 - 0.5 \cdot k_M]}{k_M} = 2 \cdot K_1$$

In case of a two-dimensional pattern 80 and seven input images 102, two linear systems of five equations similar to the equations presented above may be employed for image restoration 92.

The spatial resolution in the result high-resolution image 104 can be calculated as minimal resolved period $d_M$:

$$d_M = \frac{1}{v_O + v_M} = \frac{1}{v_O \cdot \left(1 + \frac{v_M}{v_O}\right)} = \frac{1}{v_O \cdot (1 + \varepsilon_M)} = \frac{d_O}{(1 + \varepsilon_M)} = \frac{1}{(1 + \varepsilon_M)} \cdot \frac{\lambda}{2 \cdot NA}$$

where $d_M$ is a minimal resolved spatial period in the resulting high-resolution image 104. Due to the demodulation of spatially modulated images, this minimal spatial period $d_M$ can be smaller than $d_O$ calculated by using the Abbe formula.

To conclude, a device 10 for forming a high-resolution image 104 of an object 32 may comprise: an electronic camera 44 for capturing an intermediate image 102 of the object 18, an illumination system 24 for forming a spatial modulation pattern 80 on the object 32, and a spatial demodulator 92 for performing a spatial demodulation, which is at least partially matched to the spatial modulation pattern 80. The device 10 may comprise a phase detector for detecting a phase $\phi_0, \phi_1, \phi_2$ of a spatial modulation pattern 80 from at least one of the intermediate images. The device 10 may comprise a unit for spatial light modulation 76 for synthesizing a spatial modulation pattern 80 for performing the spatial demodulation 92 at least partially matched to the spatial modulation pattern 80. The device 10 may comprise a Fourier-transform calculator for calculating at least one of a Fourier transform F and an inverse Fourier transform $F^{-1}$ of at least one of the intermediate images 102 for a direction substantially vertically to a first prevailing direction OX of the pattern 80. The device 10 may comprise a Fourier-transform calculator for calculating at least one of a Fourier transform F and an inverse Fourier transform $F^{-1}$ of at least one of the intermediate images 102 for a direction substantially vertically to a second prevailing direction OY of the pattern 80. The image size $M_X$, $M_Y$ may be substantially equal to an integer number of spatial periods of the spatial modulation pattern 80 in this image. The device 10 may measure SMI phases or SMI spatial frequencies in modulated images 102 to provide accurate demodulation. The device 10 may operate with any SMI phases that differ from each other. The device 10 may apply predefined or measured data about SMI contrast to provide accurate demodulation. The device may be designed as follows: the high-resolution image 104 can be derived from exactly one intermediate image 102, or exactly two, exactly three, exactly four, exactly five, or exactly six, or exactly seven intermediate images 102. The device 10 may comprise a digital linear filter 104. The intermediate images 102 may be electronic images 102 captured by an electronic camera 44 and wherein the device 10 may be an electronic image processing system.

An imaging system 10 may comprise a stage 14 for holding an object 32 to be imaged, a lens 26, 40, and a device 10 as described above. A transfer function of the linear digital filter 104 may substantially compensate distortions introduced by at least one of the lenses 26, 40 and the electronic camera 44. The lens 26, 40 may be at least one of a photon lens, an electron lens, a positron lens, a proton lens, an ion lens, a neutron lens, and a lens for acoustical waves. The imaging system 10 may form on the object 32 to be imaged a spatial pattern 80 having one of a one-dimensional and a two-dimensional structure. The imaging system 10 may comprise at least one of a sinusoidal, a quasi-sinusoidal, a binary, and a wavelet distribution of amplitude.

For capturing images 102 with at least two different phases $\phi_0, \phi_1, \phi_2$ of the spatial modulation pattern 80 the imaging system 10 may comprise at least one of following features: The object 32 may be moved in an object plane 30 of the imaging system 10 in relation to at least one of the lens 26, 40 and the illumination system 24, wherein the spatial modulation pattern 80 may be formed in the object plane 30. A source pattern 80 of the spatial modulation pattern 80 may be moved in a spatial modulation plane 78 of the illumination system 24 in relation to the lens 26, 40, wherein the spatial modulation pattern 80 may be formed in the object plane 30. The stage 14 may comprise a driver for moving the object 32 in an object plane 30 in relation to the illumination system 24. A source pattern 80 of the spatial modulation pattern 80 may be installed on a driver 108 for moving the source pattern 80 in a spatial modulation plane 78 of the illumination system 24. A source pattern 80 in the illumination system 24 may be formed using at least one of a liquid crystal array 76, and a micro mirror array 76, and a film 76, and a mirror 76.

The illumination system 24 may be designed to form the spatial modulation pattern 80 by creating standing waves. The illumination system 24 may be designed to form the spatial modulation pattern 80 using at least one of a laser scanning unit, an array of light emitted diodes, and an array of lasers. The spatial frequency $v_M$ of the spatial pattern 80 in the object plane 30 may be in the range of 10% to 99% of spatial bandwidth $v_O$ of the lens 26, 40 of the imaging system 10. The intermediate images 102 for deriving the high-resolution image 104 may be captured with at least two 502, 503, in particular with at least three 501, 502, 503 different positions of the spatial pattern 80 in the object plane 30. The at least two 502, 503 of the shifted different positions 501, 502, 503 of the spatial pattern 80 in the object plane 30 may be mutually shifted substantively vertically to a first prevailing direction OX, OY of the pattern 80. The intermediate images 102 for deriving the high-resolution image 104 may be captured with at least two, in particular with at least three different positions 501, 502, 503 of the spatial pattern 80 in the object plane 30 mutually shifted at least substantively vertically to a second prevailing direction OX, OY of the pattern 80, wherein the two respectively three different positions 501, 502, 503 of the spatial pattern 80 may be captured at only one, or exactly two, or exactly three, or more than three different positions 501, 502, 503 of the spatial pattern 80 mutually shifted vertically to the first prevailing direction OX of the pattern 80. An angle between the first prevailing direction OX and the second prevailing direction OA of the pattern may be approximately 60° (see FIG. 4). The two different positions 502, 503 respectively two adjacent positions of the three different positions 501, 502, 503 may be positioned in a distance to each other which is approximately a third of the spatial period $1/v_M$ of the spatial modulation pattern 80 on the object. The at least three different positions 501, 502, 503 of the spatial pattern in the object plane 30 may be in line.

The illumination system 24 may be a system 24 for irradiating the object 32 to be imaged with at least one of photons, electrons, positrons, protons, ions, and neutrons. The illumination system 24 may be designed to form the spatial modulation pattern 80 in bright field or in dark field illumination of the object 32. The illumination system 24 may be designed to form the spatial modulation pattern 80 for observation of the object 32 in transmitted light or in reflected light. The illumination system 24 may be designed to form the spatial modulation pattern 80 for observation of a fluorescence of the object 32.

A method for deriving a high-spatial-resolution image 104 from a set of images 102 captured from a structure of an object 32 is provided, wherein the illumination 110 of the object 32 is spatially-modulated, wherein the illumination 110 of the object 32 has a spatial modulation pattern 80, which may be substantially periodic, wherein one of at least one prevailing orientation OX, OY of the periodic illumination 110 is arranged substantially perpendicularly to at least one prevailing orientation OX, OY of the structure of the object 32.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time-multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While the principles of the invention have been described above in connection with specific apparatus, it is to be clearly understood that this description is made only by way of example and not as a limitation on the scope of the invention.

The invention claimed is:

1. A device for forming a high-resolution image of an object, comprising:
   - an electronic camera for capturing a plurality of intermediate images of the object;
   - an illumination system for forming a spatial modulation pattern on the object;
   - a spatial demodulator for performing a spatial demodulation, which is at least partially matched to the spatial modulation pattern; and
   - a phase detector for detecting a phase of a spatial modulation pattern from examination of at least one of the inter intermediate images.

2. The device according to claim 1, wherein the device comprises a unit for spatial light modulation for synthesizing a spatial modulation pattern for performing the spatial demodulation at least partially matched to the spatial modulation pattern.

3. The device according to claim 1, wherein the device comprises a Fourier-transform calculator for calculating at least one of a Fourier transform and an inverse Fourier transform of at least one of the intermediate images for a direction substantially vertically to a first prevailing direction of the spatial modulation pattern.

4. The device according to claim 1, wherein the image size is corrected to be substantially equal to an integer number of spatial periods of the spatial modulation pattern in at least one of the intermediate images.

5. An imaging system comprising:
a stage for holding an object to be imaged;
a lens;
an electronic camera for capturing a plurality of intermediate images of the object;
an illumination system for forming spatial modulation pattern on the object; and
a spatial demodulator for performing a spatial demodulation, which is at least partially matched to the spatial modulation pattern, wherein the spatial demodulator uses a spatial modulation contrast as a parameter of a calculation in performing the spatial demodulation.

6. The imaging system according to claim 5, wherein a transfer function of the linear digital filter substantially compensates distortions introduced by at least one of the lenses and the electronic camera.

7. The imaging system according to claim 5, wherein the lens is at least one of a photon lens, an electron lens, a positron lens, a proton lens, an ion lens, a neutron lens, and a lens for acoustical waves.

8. The imaging system according to claim 5, wherein at least one of following applies:
the object is moved in an object plane of the imaging system in relation to at least one of the lens and the illumination system, wherein the spatial modulation pattern is formed in the object plane, and
a source pattern of the spatial modulation pattern is moved in a spatial modulation plane of the illumination system in relation to the lens, wherein the spatial modulation pattern is formed in the object plane.

9. The imaging system according to claim 5, wherein at least one of following applies:
the stage comprises a driver for moving the object in an object plane in relation to the illumination system; and
a source pattern of the spatial modulation pattern is installed on a driver for moving the source pattern in a spatial modulation plane of the illumination system.

10. The imaging system according to claim 5, wherein a source pattern of the spatial modulation pattern is formed using at least one of a liquid crystal array, a micro mirror array, a film, and a mirror.

11. The imaging system according to claim 5, wherein the illumination system is designed to form the spatial modulation pattern by creating standing waves.

12. The imaging system according to claim 5, wherein the illumination system is designed to form the spatial modulation pattern using at least one of a laser scanning unit, an array of light emitted diodes, and an array of lasers.

13. The imaging system according to claim 5, wherein the illumination system is designed to form the spatial modulation pattern in bright field or in dark field illumination of the object.

14. The imaging system according to claim 5, wherein the illumination system is designed to form the spatial modulation pattern for observation of the object in transmitted light or in reflected light.

15. The imaging system according to claim 5, wherein the illumination system is designed to form the spatial modulation pattern for observation of a fluorescence of the object.

16. A method for deriving a high-spatial-resolution image from a set of images captured from a structure of an object, comprising:
illuminating the object, wherein the illumination of the object has a spatial modulation pattern which is substantially periodic, wherein at least one prevailing orientation of the periodic illumination is arranged substantially perpendicularly to at least one prevailing orientation of the structure of the object;
capturing a plurality of intermediate images of the object, wherein an intermediate image is formed by shifting a location of an image of the spatial modulation pattern on the object;
correcting a size of an intermediate image of the intermediate images to be substantially equal to an integer number of spatial periods of the spatial modulation pattern;
applying a filter to the intermediate images of the object; and
applying digital demodulation to the filtered intermediate images.

17. The device of claim 1, wherein the detecting comprises detecting the phase that corresponds to a maximum amplitude of a spatial spectrum in a zone near a known value of a spatial frequency $\upsilon_M$ of the spatial modulation pattern.

18. The device of claim 17, further comprising calculating a spatial period of the spatial modulation pattern as a period in pixels corresponding to a spatial frequency of the maximum amplitude of the spatial spectrum in the zone near the known value of the spatial frequency $\upsilon_M$ of the spatial modulation pattern.

19. The imaging system of claim 8, wherein the capturing the plurality of images and the moving the object or the spatial modulation pattern comprises capturing images based upon one of the two following sets of positions:
an initial position, a shift of the spatial modulation pattern relative to the object ⅓ of the spatial period of the spatial modulation pattern and a shift −⅓ of the spatial period of the spatial modulation pattern from the initial position along a first axis, and a shift of the spatial modulation pattern relative to the object ⅓ of the spatial period of the spatial modulation pattern and a shift −⅓ of the spatial period of the spatial modulation pattern from the initial position along a second axis, wherein the second axis is perpendicular to the first axis; and
an initial position, a shift of the spatial modulation pattern relative to the object ⅓ of the spatial period of the spatial modulation pattern and a shift −⅓ of the spatial period of the spatial modulation pattern from the initial position along a first axis, a shift of the spatial modulation pattern relative to the object ⅓ of the spatial period of the spatial modulation pattern and a shift −⅓ of the spatial period of the spatial modulation pattern from the initial position along a second axis, wherein the second axis is rotated approximately 60 degrees from the first axis, and a shift of the spatial modulation pattern relative to the object ⅓ of the spatial period of the spatial modulation pattern and a shift −⅓ of the spatial period of the spatial modulation pattern from the initial position along a third axis, wherein the third axis is rotated approximately −60 degrees from the first axis.

20. The device of claim 1, wherein the spatial demodulator is to use two 3 by 3 complex arrays in performing spatial demodulation.

* * * * *